March 17, 1970     G. SCHERTEL ET AL     3,500,703

TRANSMISSION FRAME FOR MECHANICAL DEVICES

Filed May 28, 1968

United States Patent Office 3,500,703
Patented Mar. 17, 1970

3,500,703
TRANSMISSION FRAME FOR MECHANICAL DEVICES
Günther Schertel, Lauf, Wilhelm Bilz, Schwaig, and Horst Fierek and Bernhard Hentschel, Nuremberg, Germany, assignors to Siemens Aktiengesellschaft, a corporation of Germany
Filed May 28, 1968, Ser. No. 732,607
Claims priority, application Germany, June 3, 1967, S 110,165
Int. Cl. F16h 57/02; G06
U.S. Cl. 74—606            11 Claims

ABSTRACT OF THE DISCLOSURE

A frame for holding the transmissions of precision mechanical instruments has a plurality of individual annular parts mutually superimposed and coaxial with respect to each other. At least two of the annular parts are mutually adjacent and have respective end faces facing each other. Recesses adapted to bear a shaft of the transmission are provided in one of the end faces. The other of the end faces is adjacent the recesses for closing the same.

---

Our invention relates to frames for holding the transmissions of mechanical devices, especially precision mechanical instruments.

Frames for holding the transmissions of precision mechanical instruments have been fashioned of sheet-metal. The fabrication of such frames from sheet-metal requires production steps such as stamping, bending, drilling, reaming, riveting or screwing, which are complicated and costly. Considerable expense is also incurred in mounting the shafts of the transmission with their associated gear parts and in adjusting axial play, the latter being done with guide disks or the like.

It is an object of our invention to provide a frame in which the transmission parts may be positioned at low cost.

It is another object of our invention to provide a frame in which the transmission shafts need not necessarily be disposed in parallel relation with respect to each other.

In accordance with our invention, a transmission frame is assembled from individual parts which in a preferred form are annular rings. These rings are centered with respect to each other or another part, the latter being, for an example, a housing. The rings have end faces in which recesses are formed for bearing the transmission shafts. An adjacent part or another part is placed so as to close the recess. The individual rings are preferably placed in a common housing with the transmission members preinserted. The housing at the same time can act as a bearing surface for restricting the axial movement of the shaft members. Axial movement may also be restricted by an ancillary bearing formed on the individual ring, by guide disks or by a suitably constructed shaft, gear hub or the like. Placing the means for restricting axial movement at only one location provides the advantage of obviating any difficulties caused by heat expansion, swelling and so on. The lateral movement of the shaft can be restricted by a suitable bearing on the ring or by another part. The latter could, for example, be the housing and so make it unnecessary to use guide disks.

The invention will be further elucidated with reference to embodiments illustrated by way of example on the accompanying drawings in which.

Figure 1:
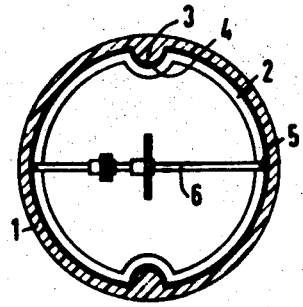
FIG. 1 is a schematic view, in section, of a cylindrical housing and an annular ring coaxially disposed therein.

Referring first to FIG. 1, an annular ring 2 is coaxially disposed within a cylindrical housing 1 formed of synthetic material. A protuberance 3, formed on the inner wall of the cylindrical housing and a notch 4 in the outer wall of the ring 2 are keyed to each other so as to permit the latter to be aligned with the housing. Recesses 5 are formed in the end face of ring 2 and are adapted to bear the gear shaft 6.

Figure 2:
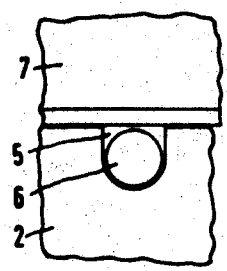
FIG. 2 is a lateral enlarged view of the region of the bearing in the annular ring.

FIG. 2 shows an annular ring 2 having a recess 5 which bears the gear shaft 6. The recess 5 is closed by another annular ring 7 thereby restricting the lateral movement of the shaft 6. Not illustrated in FIG. 2 is that the latter function may also be effected by protrusions formed on on the inner wall of a cylindrical housing. These protrusions close the recess at its opening in the plane defined by the end face of the annular ring and are considered in connection with the embodiment shown in FIG. 6.

Figure 3:
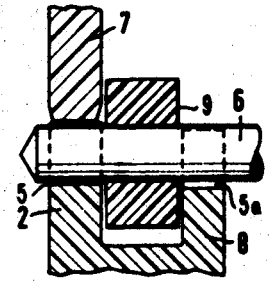
FIG. 3 is a schematic view, in section, of a bearing arrangement for restricting axial movement of the shaft.

FIG. 3 illustrates a bearing arrangement for restricting the axial movement of shaft 6. An ancillary bearing lug 8 is formed on the inner wall of annular ring 2 in the region of recess 5. A recess 5a corresponding to recess 5 is formed in lug 8, both recesses being adapted to bear the shaft 6. A guide disk 9 mounted on shaft 6 cooperates with ring 2 and lug 8 to restrict its axial movement. An annular ring 7 closes recess 5 thereby restricting the lateral movement of shaft 6.

Figure 4:
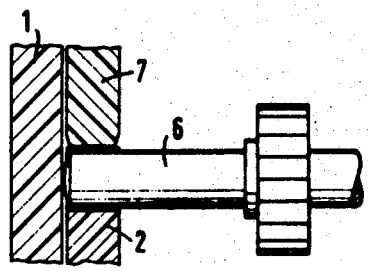
FIG. 4 is a schematic view, in section, of a bearing arrangement wherein the housing acts as a bearing surface.

FIG. 4 shows that the housing can be used to restrict the axial movement of the gear shaft. A recess 5 in the annular ring 2 bears shaft 6. The inner wall of housing 1 acts as a bearing surface to restrict the axial movement of shaft 6. The closure of recess 5 by annular ring 7 restricts the lateral movement of shaft 6.

The frame for holding a complicated gear arrangement may comprise several annular rings coaxially superimposed upon one another and held in position by a suitable housing. Prior to being placed in the housing, the rings are provided with their respective gear elements. An assembly of this kind is illustrated in FIG. 5 wherein superimposed rings 2, 2a and 2b are shown concentrically disposed in cylindrical housing 1.

Figure 5:
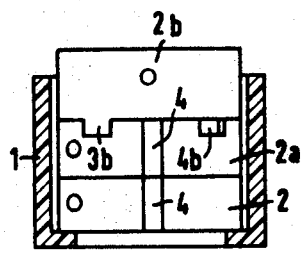
FIG. 5 is a schematic view showing an embodiment of the frame of the present invention comprising three annular rings superimposed upon one another within a cylindrical housing.

From FIG. 5, it can also be seen that the annular rings may be centered not only relative to the housing 1 but also relative to each other. The rings 2 and 2a are prevented from rotating by the same registration means as those shown in FIG. 1. In contrast thereto, ring 2b is centered by having noses 3b in engagement in recesses 4b of ring 2a.

Figure 6:
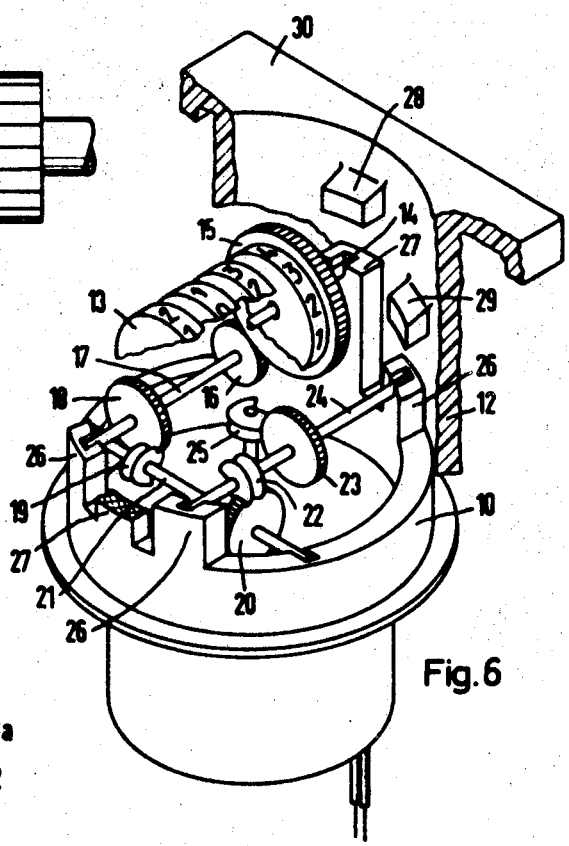
FIG. 6 shows in schematic perspective an embodiment of the frame of the present invention wherein the annular ring is provided with longitudinal extensions for supporting shaft members.

The embodiment of the transmission frame of the invention according to FIG. 6 employs only one ring 10 which, however, performs the function of several annular rings. This is achieved by forming the annular ring 10 with at least two mutually adjacent longitudinal extensions. A recess adapted to bear a shaft is formed in each extension and suitable protrusions for closing the recesses are provided on the inner wall of the housing 12.

Referring more specifically to FIG. 6, a meter train 13 is rotatably mounted on shaft 14 by means of spur gear 15. Gear wheels 16 and 18, worm 19 and worm gear 20, and worm 22 and worm gear 23 are mounted on shafts 17, 21 and 24, respectively. This gear arrangement is driven by worm 25 which is connected with a synchromotor, the latter not being shown in FIG. 6. Since shafts 14, 17 and 24, and 21 lie in different planes, it would be necessary to provide at least three annular rings. Two extension pairs 26 and extension pair 27 obviate the need for additional rings. The extension members comprising each pair are mutually adjacent and their end faces as well as the end face of ring 10 are formed with recesses adapted to bear the shafts 17, 24, 14 and 21. The recesses are closed by corresponding protrusions formed on the inner wall of housing 12. Two such protrusions 28 and 29 corresponding to extension members of extension pairs 26 and 27 are depicted in the figure. Not shown in FIG. 6 is an additional fifth shaft which carries the shift drive for the decimal sequence control of the numeral rollers. After all the shafts and other gear parts have been inserted, the housing 12 is placed over the extension pairs 26 and 27 and the ring 10. Screws, for example, can be used to secure the housing. The parts 10 and 12 are formed in a simple manner, preferably by the extrusion of synthetic material. This substantially reduces the manufacturing cost of the gear frame.

In the embodiment of FIG. 6, the cylindrical housing is provided with a square frame 30 upon which a plate having windows for viewing the numerals of the number wheels or rollers 13 can be mounted.

As shown, the annular shape of housings 1, 12 and rings 2, 2a, 2b, 7 and 10 provides the advantage that the gear elements need not be positioned parallel with respect to each other.

It should be understood that the invention is not limited to the embodiments illustrated on the drawing. For example, the frame parts may be formed so as to have a square or rectangular shape in lieu of the annular shape. In addition, the registration of the parts with respect to one another may be effected in a manner other than that illustrated in FIGS. 1 and 5.

To those skilled in the art it will be obvious upon a study of this disclosure that our invention permits of various modifications with respect to structural features and hence that the invention may be given embodiments other than particularly illustrated and described herein, without departing from the essential features of the invention and within the scope of the claims annexed hereto.

We claim:

1. In a precision mechanical instrument having a transmission and a frame for journalling said transmission, said frame comprising a plurality of individual annular parts mutually superimposed and coaxial with respect to each other, at least two of said parts being mutually adjacent and having respective end faces facing each other, recess means formed in one of said end faces and adapted to bear a shaft of the transmission therein, the other of said end faces being adjacent said recess means and closing the same.

2. A frame according to claim 1, wherein said annular parts are circular rings, at least one of said rings having an inner wall, ancillary bearing means formed on said ring inner wall at said recess means, said ancillary bearing means having an end face, other recess means formed in said face of said ancillary bearing means, said recess means and said other recess means being adapted to bear a common shaft for restricting its axial movement of the shaft.

3. A frame according to claim 1, wherein said annular parts are circular rings and wherein a first registration means formed in one of said faces and a second registration means formed in the other of said faces, said first and second registration means being keyed to each other so as to position said mutually adjacent rings with respect to each other.

4. A frame according to claim 1, wherein said annular parts are circular rings and wherein said recess means are formed in each of said first-mentioned rings, said frame including an ancillary ring, the latter being in turn coaxially superimposed upon said first-mentioned rings.

5. A frame according to claim 1, wherein said annular parts are circular rings, and wherein said frame includes annular housing means adapted for accommodating said rings, said rings being disposed within and coaxial with said housing means.

6. A frame according to claim 5, said housing means having a bearing surface for restricting axial movement of a transmission shaft received in said recess means.

7. A frame according to claim 5, comprising first registration means formed on said inner wall, said circular rings having respective outer walls, second registration means formed on said outer wall of at least one of said rings, said first and second registration means being keyed to each other so as to position said ring with respect to said housing means.

8. A frame according to claim 5, comprising third registration means formed in one of said faces and a fourth registration means formed on the other of said faces, said third and fourth registration means being keyed to each other so as to position said mutually adjacent rings with respect to each other.

9. A frame according to claim 1, wherein one of said two parts is an annular housing surrounding the other of said two parts for housing the transmission, said other part having one of said end faces, said recess means being formed in said one end face, said housing having an inner wall adjacent to said other part, said inner wall being formed with protrusion means disposed adjacent said recess means, said protrusion means having the other of said end faces.

10. In a frame according to claim 9, said housing means having a bearing surface on said inner wall for restricting axial movement of a transmission shaft received in said recess means.

11. In a frame according to claim 9, said annular part being an annular ring, said ring having longitudinal extensions formed thereon, said extensions being mutually adjacent and having end surfaces, at least some of said recess means being formed in said end surfaces, said protrusion means including at least one protrusion disposed on said wall so as to close said recess means in said end surfaces.

References Cited

UNITED STATES PATENTS

| 2,055,296 | 9/1936 | Lane | 74—606 XR |
| 3,058,654 | 10/1962 | Prohaska et al. | 74—606 XR |
| 3,073,176 | 1/1963 | Daugirdas | 74—606 XR |
| 3,269,204 | 8/1966 | Schleicher | 74—606 XR |

FRED C. MATTERN, Jr., Primary Examiner

F. D. SHOEMAKER, Assistant Examiner

U.S. Cl. X.R.

235—1